Patented Aug. 15, 1950

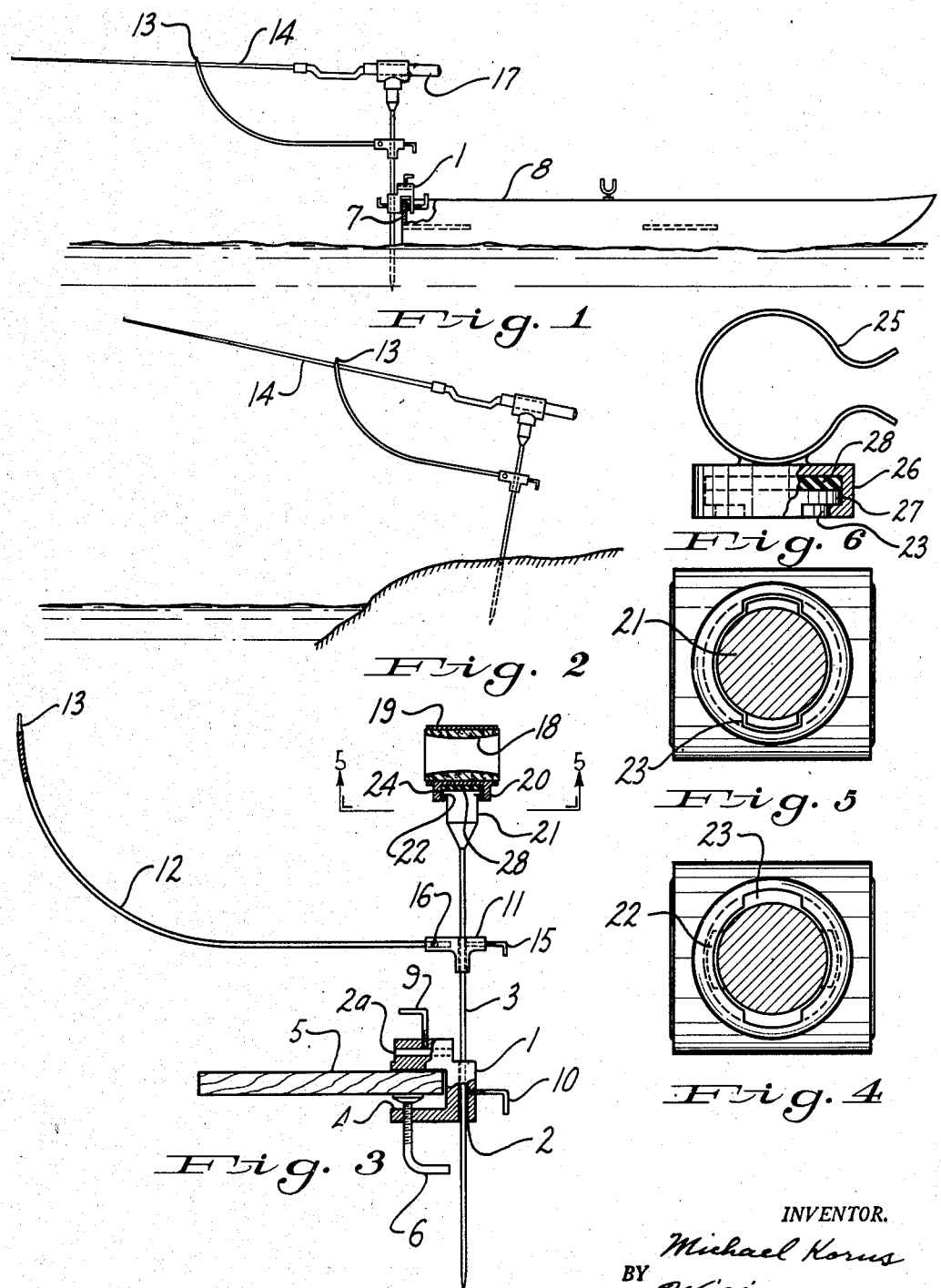

2,518,908

UNITED STATES PATENT OFFICE 2,518,908

FISHING ROD GUIDE

Michael Korus, Pittsburgh, Pa.

Application October 18, 1947, Serial No. 780,621

2 Claims. (Cl. 248—42)

This invention relates to new and useful improvements in fishing rod guides for use on boats or on shore, and it is among the objects thereof to provide a fishing rod guide having adjustable mounting brackets for fastening and supporting fishing poles.

The invention will become more apparent from a consideration of the accompanying drawing, constituting a part hereof, in which like reference characters designate like parts, and in which—

Fig. 1 is a side elevational view of a fishing rod holder mounted on a boat, embodying the principles of this invention;

Fig. 2 a similar view of the holder mounted on a bank or shore line;

Fig. 3 a side elevational view, partially in cross-section, of the fishing rod holder;

Figs. 4 and 5 cross sectional views taken along the line 5—5, Fig. 3, showing the rod holder mounted in its unlocked and locked positions; and Fig. 6 a side elevational view, partially broken away in section, of a modified form of rod holder.

With particular reference to Fig. 3 of the drawing, the numeral 1 designates a clamping bracket having a bore or opening 2 for receiving a rod 3 and having a slot 4 by which it may be fastened to the seat 5 of a boat by a swivel screw 6. As shown in Fig. 1, the bracket 1 may similarly be clamped to the stern 7 of a boat 8 or it may be thus fastened to the side of a boat. With reference to Fig. 3, the bracket 1 is provided with a bore or opening 2a provided with a screw 9 for receiving and clamping the rod 3 which is thereby disposed in a horizontal position. A screw 10 secures the rod 3 in the vertical position as shown in Fig. 3.

Slidably mounted on the rod 3 is a bracket 11 for receiving a guide arm 12 which may be curved and provided with a bifurcated end 13 in which a fishing pole 14 rests as shown in Figs. 1 and 2. The bracket 11 is provided with a screw 15 to lock it in any adjusted position on the rod 3 and the guide arm 12 is fastened by a screw 16 in the bracket to render it removable when not in use.

Several means for securing the handle end 17 of the fishing pole are shown. They consist of a ferrule 18 of cork or other non-metallic substance which is a liner in a metal sleeve 19 such as brass having a boss 20 that fits upon the head 21 of the rod 3. The head 21 is provided with lugs 22 which are adapted to fit into slots 23, Figs. 4 and 5, of the boss 20. By turning the member 19 after the lugs 22 are inserted in the slots 23, they are interlocked in a groove 24 of the boss 20 as shown in Fig. 4.

Another form of handle grip or handle is shown in Fig. 6 and consists of a spring 25 mounted on a cylindrical bracket 26 which has the groove 27 and the bifurcated lug slots 23 of the device shown in Figs. 4 and 5. A rubber liner 28 may be provided to aid in locking the handle holder on the end of the rod 3. In use the bracket 1 is clamped to the seat 5 or the wall of the boat as shown, and the rod 3 is secured in either the vertical position, as shown in Figs. 1, 2 and 3, or the horizontal position by inserting it in the bore 2a. By drawing the fastening screws 9 and 10 in whichever position the rod 3 is disposed, it will be held securely in place at any adjusted position.

The guide arm 12 is then slid to a desired position to bring the bifurcated rod support 13 in alignment with the handle support 18 or 25, as the case may be, and the fishing pole is then held in the desired position for fishing. In the view of Fig. 2, the rod 3 is provided with a point which may be pushed into the soil to hold the rod for bank fishing.

The entire structure may be made of brass or other non-rusting metal, and when employed in the manner illustrated relieves the fisherman of the need for gripping the pole, which permits trolling or rowing of the boat or other activity.

Although one embodiment of the invention has been herein illustrated and described, it will be evident to those skilled in the art that various modifications may be made in the details of construction without departing from the principles herein set forth.

I claim:

1. An adjustable fishing rod guide comprising a support having a socket portion for receiving the handle of a fishing rod, said support comprising a rod having an enlarged end with a bayonet lock and said rod holder having a bayonet connection for interaction with the bayonet lock of the support, a bracket slidably mounted on said support adapted to be secured in adjusted position thereon, an arcuate guide secured to said bracket having a curved bifurcated end in alignment with the handle socket portion for supporting the rod a substantial distance from the said socket portion.

2. A fishing rod guide comprising a support in the form of a relatively thin rod, a bracket adapted to be clamped on a boat having a slot for receiving the rod and clamping means for securing the rod in adjusted position therein, said rod having an enlarged head with screw lugs, a handle support or socket having a recess portion for interacting with the screw lugs of the rod support to be removably attached thereto, a guide bracket slidably mounted on the rod having clamping means for securing the same in adjusted position, and an arcuate guide arm having a bifurcated end secured to said bracket and adapted to engage the rod in alignment with the socket portion for engaging the handle portion of the rod.

MICHAEL KORUS.

REFERENCES CITED

The following references are of record in the file of this patent:

UNITED STATES PATENTS

| Number | Name | Date |
|---|---|---|
| 375,133 | Creque | Dec. 20, 1887 |
| 1,619,152 | Nunlist | Mar. 1, 1927 |
| 2,439,847 | Disotell | Apr. 20, 1948 |